US012796815B2

(12) United States Patent
Maves et al.

(10) Patent No.: US 12,796,815 B2
(45) Date of Patent: Nov. 17, 2026

(54) TELEVISION MOUNT WITH HEIGHT ADJUSTMENT FEATURE

(71) Applicant: Legrand AV Inc., Eden Prairie, MN (US)

(72) Inventors: Adam Maves, Eden Prairie, MN (US); Stephen Quaglieri, Eden Prairie, MN (US); Jimmie Mugge, Eden Prairie, MN (US)

(73) Assignee: LEGRAND AV INC., Minnetonka, MN (US)

( * ) Notice: Subject to any disclaimer, the term of this patent is extended or adjusted under 35 U.S.C. 154(b) by 44 days.

(21) Appl. No.: 19/012,135

(22) Filed: Jan. 7, 2025

(65) Prior Publication Data

US 2025/0221531 A1 Jul. 10, 2025

Related U.S. Application Data

(60) Provisional application No. 63/618,452, filed on Jan. 8, 2024.

(51) Int. Cl.
*F16M 11/04* (2006.01)
*A47B 97/00* (2006.01)
*F16N 11/10* (2006.01)

(52) U.S. Cl.
CPC ......... *A47B 97/001* (2013.01); *F16M 11/046* (2013.01); *F16N 11/10* (2013.01); *F16M 2200/066* (2013.01)

(58) Field of Classification Search
CPC .... A47B 97/001; F16M 11/046; F16M 11/10; F16M 2200/066; F16M 11/18; F16M 11/2064; F16M 11/2085; F16M 11/2092; F16M 13/02; F16M 11/041; F16M 2200/022; F16M 2200/028; F16M 2200/068; F16M 11/08
See application file for complete search history.

(56) References Cited

U.S. PATENT DOCUMENTS

| | | | | |
|---|---|---|---|---|
| 1,121,313 | A | 12/1914 | Watson | |
| 6,604,722 | B1 * | 8/2003 | Tan | F16M 13/02 254/122 |
| 8,693,172 | B2 | 4/2014 | Russell | |
| 11,215,313 | B1 * | 1/2022 | Beil | F16M 11/2014 |

(Continued)

FOREIGN PATENT DOCUMENTS

| | | |
|---|---|---|
| CN | 1917093 | 2/2007 |

OTHER PUBLICATIONS

European Communication pursuant to Article 94(3) EPC, Feb. 5, 2026, 5 pages.

(Continued)

*Primary Examiner* — Amy J. Sterling
(74) *Attorney, Agent, or Firm* — Bradley J. Thorson; DeWitt LLP

(57) ABSTRACT

A wall mount for a television or monitor includes a display interface that is selectively adjustable in height above the floor with a rotatable screw that shifts the display interface up or down depending on the direction of rotation of the screw. The display interface can have a latch so as to be selectively removable from the remainder of the mount. The mount can include a support or arm assembly which may be articulated to enable free positioning of the television or monitor relative to the wall.

22 Claims, 16 Drawing Sheets

(56) References Cited

U.S. PATENT DOCUMENTS

| | | | | |
|---|---|---|---|---|
| 12,146,606 B2 * | 11/2024 | Liu | F16M 13/02 |
| 2010/0171014 A1 * | 7/2010 | Stemple | F16M 11/2014 248/201 |

OTHER PUBLICATIONS

Extended European Search Report, for related European Patent Application No. 25150723.2, dated Jun. 11, 2025, 6 pages.

* cited by examiner

TELEVISION MOUNT WITH HEIGHT ADJUSTMENT FEATURE

RELATED APPLICATIONS

The present application claims the benefit of U.S. Provisional Application No. 63/618,452, entitled TELEVISION MOUNT WITH HEIGHT ADJUSTMENT FEATURE, and filed Jan. 8, 2024, said application being hereby fully incorporated herein in its entirety by reference.

TECHNICAL FIELD

The invention relates to mounts for televisions, and more specifically, mounts for attaching a flat panel television and related devices to a wall.

BACKGROUND

As flat panel televisions and monitors have become more popular, there has been an increasing need to mount them to a wall to avoid using furniture to support the device, which takes up floor space. Also, it is often desirable to position the television more precisely for optimum viewing and sound, and for aesthetic reasons. Various types of mounts have been developed for these purposes. For example, U.S. Pat. No. 8,693,172 which is owned by the owners of the present invention and hereby fully incorporated herein by reference, discloses a full-motion mount for attaching a television to a wall. The mount enables the television to be tilted, pivoted side-to-side, and moved closer to or further away from the wall as desired.

A drawback of existing full-motion television mounts, however, is that vertical height adjustment of the television is only accomplished where the television attaches to the mount. This is usually accomplished through two separate adjustments. This causes additional time for installation, and limits flexibility of installation.

What is needed is a full-motion television mount that addresses the drawbacks of prior mounts.

SUMMARY

Disclosed herein are embodiments of a full-motion television mount that address the drawbacks of prior mounts. According to embodiments of the invention a wall mount for a television or monitor includes a display interface that is selectively adjustable in height above the floor with a rotatable screw that shifts the display interface up or down depending on the direction of rotation of the screw. The display interface can have a latch so as to be selectively removable from the remainder of the mount. The mount can include a support or arm assembly which may be articulated to enable free positioning of the television or monitor relative to the wall.

According to embodiments, a mount for attaching a television or monitor to a wall includes a wall interface assembly adapted to attach to the wall, a support assembly presenting a first end and a second opposing end, the first end operably coupled to the wall interface assembly, and a display interface adapted to receive the television or monitor and operably coupled to the second end of the support assembly. The display interface includes a display attachment assembly, and a height adjustment assembly operably coupling the second end of the support assembly and the display attachment assembly. The height adjustment assembly includes a guide, a coupler plate coupled with the second end of the support assembly, the guide engaged with the coupler plate such that the guide is vertically slidable on the coupler plate, a nut being fixedly coupled to the coupler plate, and an adjustment screw coupled to the guide and threadedly engaged with the nut, the adjustment screw rotatable to cause vertical shifting of the guide on coupler plate, wherein the display attachment assembly is translated upward or downward relative to the support assembly depending on the direction of rotation of the adjustment screw.

The mount can include a tilt head assembly operably coupling the second end of the support assembly and the coupler plate, the tilt head assembly arranged to enable selective tilting of the display interface about a virtual tilt axis spaced-apart forwardly from the display interface. A latch can selectively secure the tilt head assembly to the coupler plate.

In embodiments the tilt head assembly includes an arcuate tilt guide sandwiched between a rear glide and a front glide. In other embodiments, the tilt head assembly has a pivot connection bracket operably coupled to the support assembly and carrying a plurality of followers and a tilt guide bracket coupled to the coupler plate and defining a plurality of guide slots, each one of the plurality of followers engaged in a separate one of the plurality of guide slots. The guide slots may be symmetrical and the virtual tilt axis is fixed in position relative to the display interface, or the guide slots may be asymmetrical with the virtual tilt axis shifting with an instantaneous center of rotation of the tilt guide bracket.

In embodiments, the display attachment assembly includes a pair of spaced-apart horizontal crossbars and a pair of spaced-apart vertical uprights, the vertical uprights adapted to attach to the television or monitor, the crossbars operably coupled to the elongate guide. The spaced-apart vertical uprights may be separately selectively shiftable on the spaced-apart horizontal crossbars. In embodiments, support assembly can be a single arm or at least one articulating arm.

In further embodiments, an electronic display system includes a television or monitor, and a mount. The mount includes a wall interface assembly adapted to attach to a wall, a support assembly presenting a first end and a second opposing end, the first end operably coupled to the wall interface assembly, and a display interface adapted to receive the television or monitor and operably coupled to the second end of the support assembly. The display interface includes a display attachment assembly, and a height adjustment assembly operably coupling the second end of the support assembly and the display attachment assembly. The height adjustment assembly includes a guide, a coupler plate coupled with the second end of the support assembly, the guide engaged with the coupler plate such that the guide is vertically slidable on the coupler plate, a nut being fixedly coupled to the coupler plate, and an adjustment screw coupled to the guide and threadedly engaged with the nut. The adjustment screw is rotatable to cause vertical shifting of the guide on coupler plate, wherein the display attachment assembly is translated upward or downward relative to the support assembly depending on the direction of rotation of the adjustment screw.

In embodiments, the system can include a tilt head assembly operably coupling the second end of the support assembly and the coupler plate, the tilt head assembly arranged to enable selective tilting of the display interface about a virtual tilt axis spaced-apart forwardly from the display interface.

In embodiments the tilt head assembly includes an arcuate tilt guide sandwiched between a rear glide and a front glide. In other embodiments, the tilt head assembly has a pivot connection bracket operably coupled to the support assembly and carrying a plurality of followers and a tilt guide bracket coupled to the coupler plate and defining a plurality of guide slots, each one of the plurality of followers engaged in a separate one of the plurality of guide slots. The guide slots may be symmetrical and the virtual tilt axis is fixed in position relative to the display interface, or the guide slots may be asymmetrical with the virtual tilt axis shifting with an instantaneous center of rotation of the tilt guide bracket.

In embodiments, the display attachment assembly includes a pair of spaced-apart horizontal crossbars and a pair of spaced-apart vertical uprights, the vertical uprights adapted to attach to the television or monitor, the crossbars operably coupled to the elongate guide. The spaced-apart vertical uprights may be separately selectively shiftable on the spaced-apart horizontal crossbars. In embodiments, support assembly can be a single arm or at least one articulating arm.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
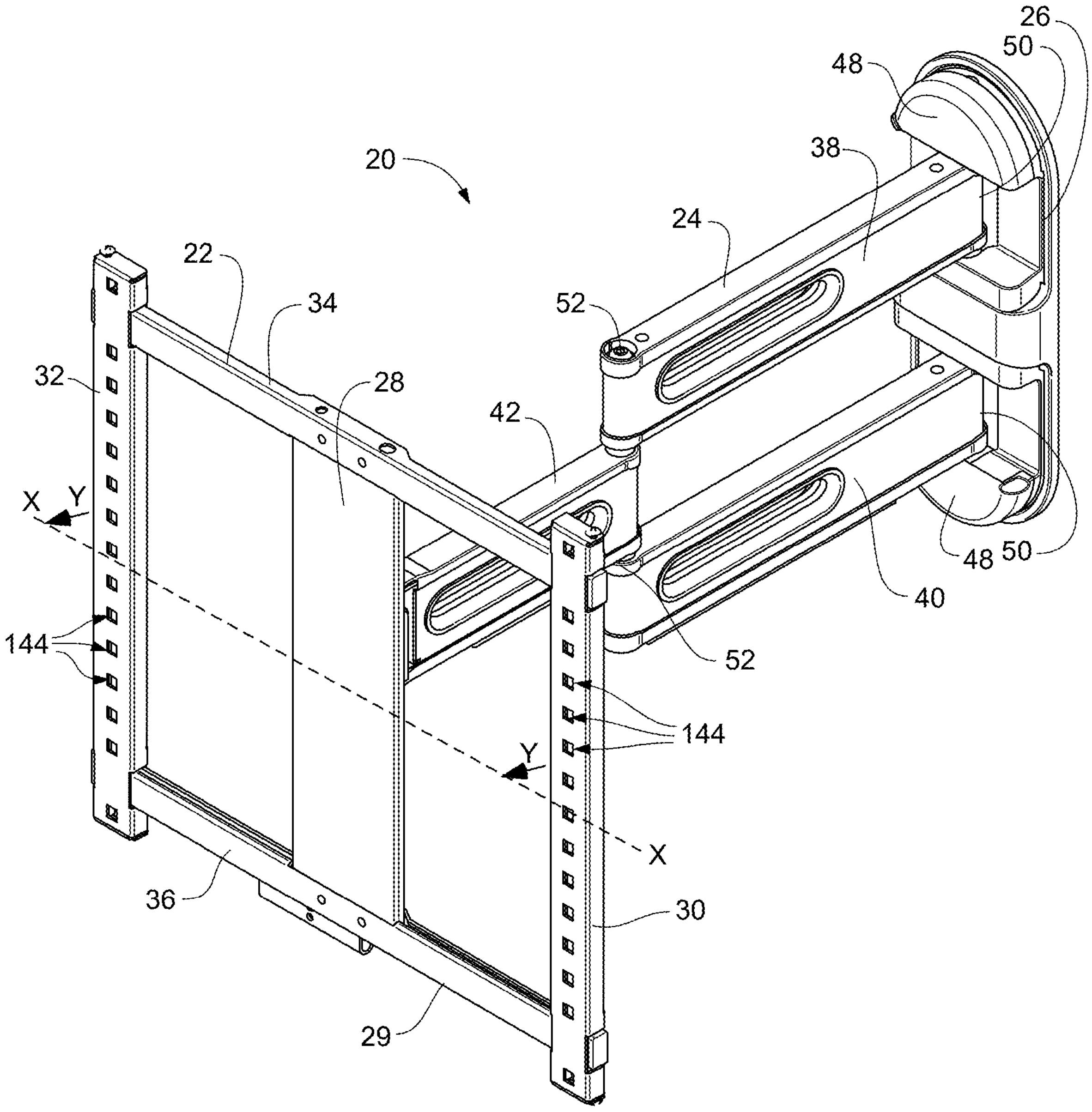
FIG. 1 is a front isometric view of a mount according to an embodiment of the invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 2:
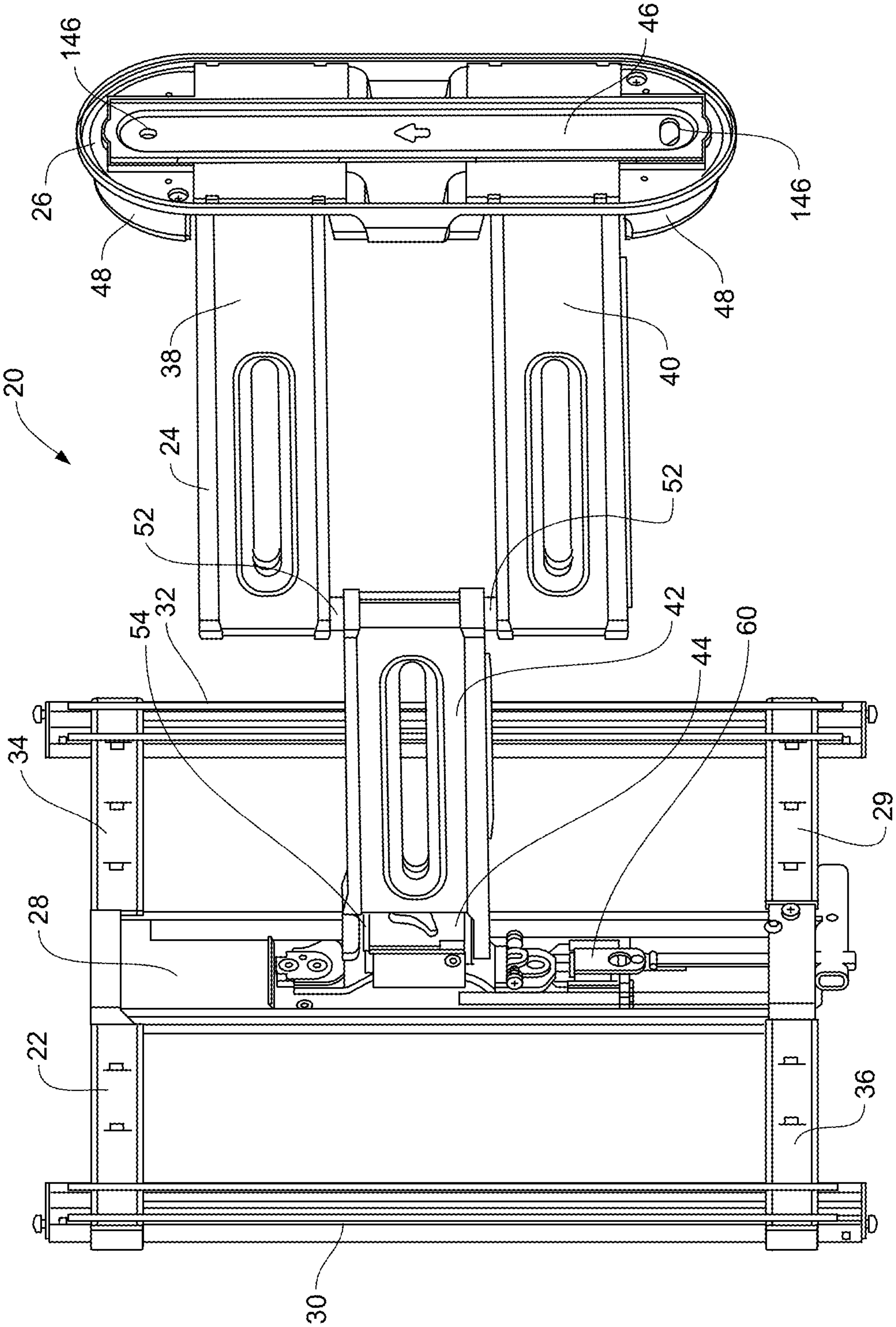
FIG. 2 is a rear isometric view of the mount of FIG. 1.
Figure 3:
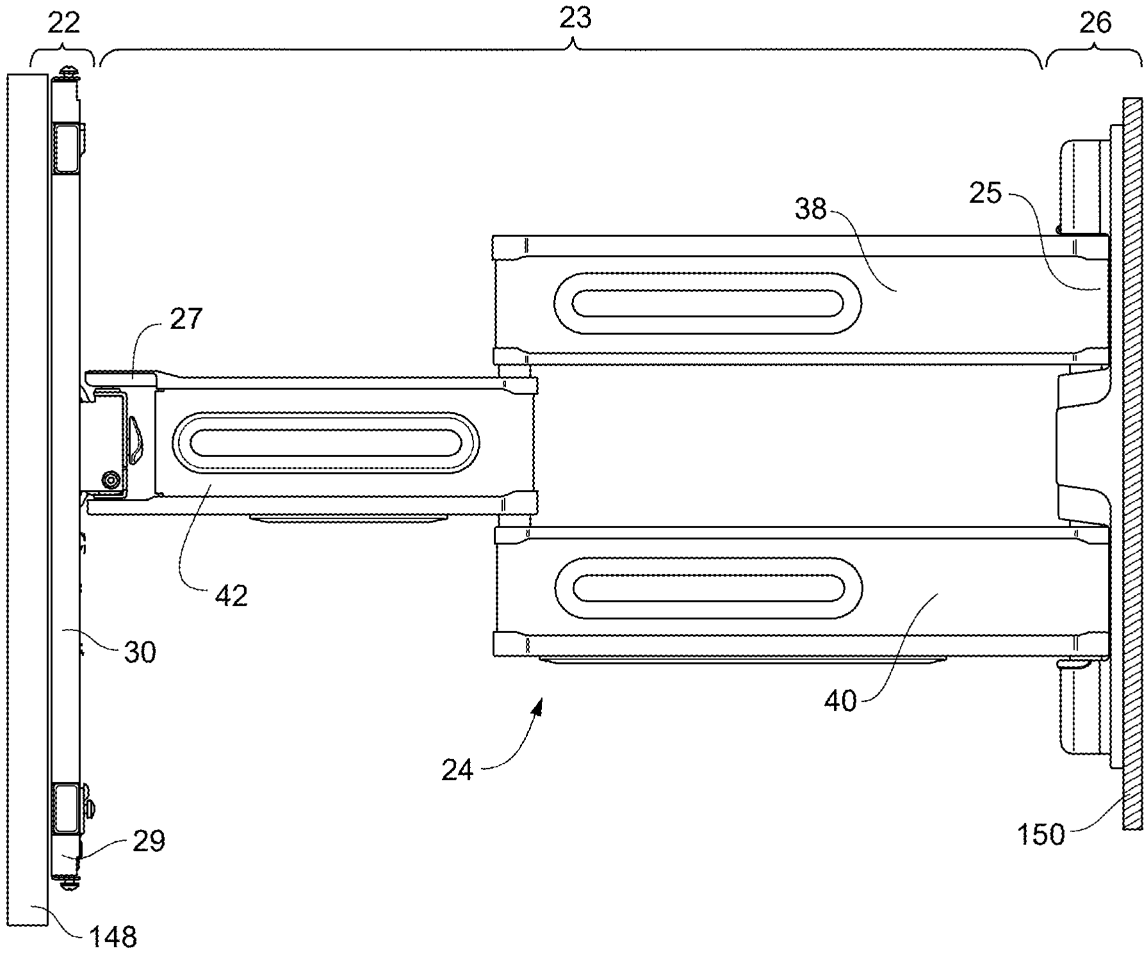
FIG. 3 is a right elevation view of the mount of FIG. 1, with attached display and mounted to a wall.

Depicted in FIGS. 1-3 is a television mount 20 according to embodiments of the invention. Mount 20 for mounting a display 148 (such as a television or monitor) to a wall 150 generally includes display interface assembly 22, support assembly 23 in the form of articulating arm assembly 24, and wall interface assembly 26. It will be appreciated that articulating arm assembly 24 can be replaced with any suitable arm assembly, such as a one-piece single arm or multiple articulating arms, while remaining within the scope of the invention. For a non-limiting example, support assembly 23 could be replaced with a scissors extension mechanism such as disclosed in U.S. Pat. No. 8,508,918, owned by the owners of the present application, and hereby fully incorporated herein by reference.

Display interface assembly 22 generally includes central column 28, and a display attachment assembly 29 in the form of uprights 30, 32, and crossbars 34, 36. It would be appreciated that display attachment assembly 29 could be replaced with any structure suitable for attaching a television or monitor such as a plate with appropriate apertures arranged in a standard VESA pattern.

As depicted in FIG. 3, support assembly 23 presents a first end 25 coupled with wall interface 26 and a second end 27 coupled with display interface 22. When support assembly 23 is embodied as articulating arm assembly 24, the assembly generally includes inner arms 38, 40, outer arm 42, and tilt head assembly 44. Wall interface 26 generally includes wall bracket 46, which can be attached to wall 150 with fasteners (not depicted), and decorative covers 48. Inner arms 38, 40, are coupled to wall interface 26 with pivots 50, and to outer arm 42 with pivots 52. Outer arm 42 is coupled to tilt head assembly 44 with pivot 54.

Figure 4:
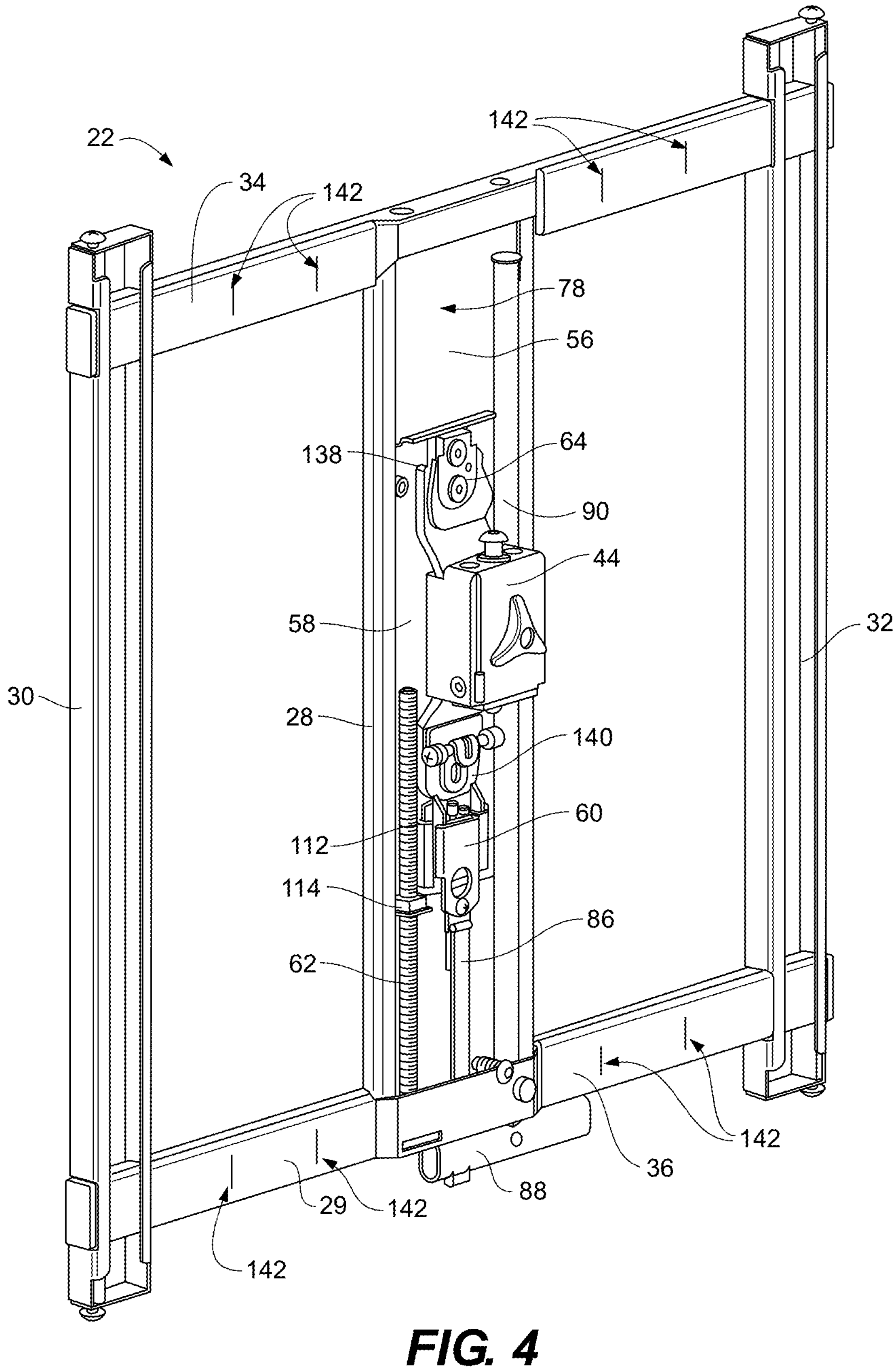
FIG. 4 is a partial rear isometric view of the display interface of the mount of FIG. 1 with a tilt head assembly coupled thereto.
Figure 5:
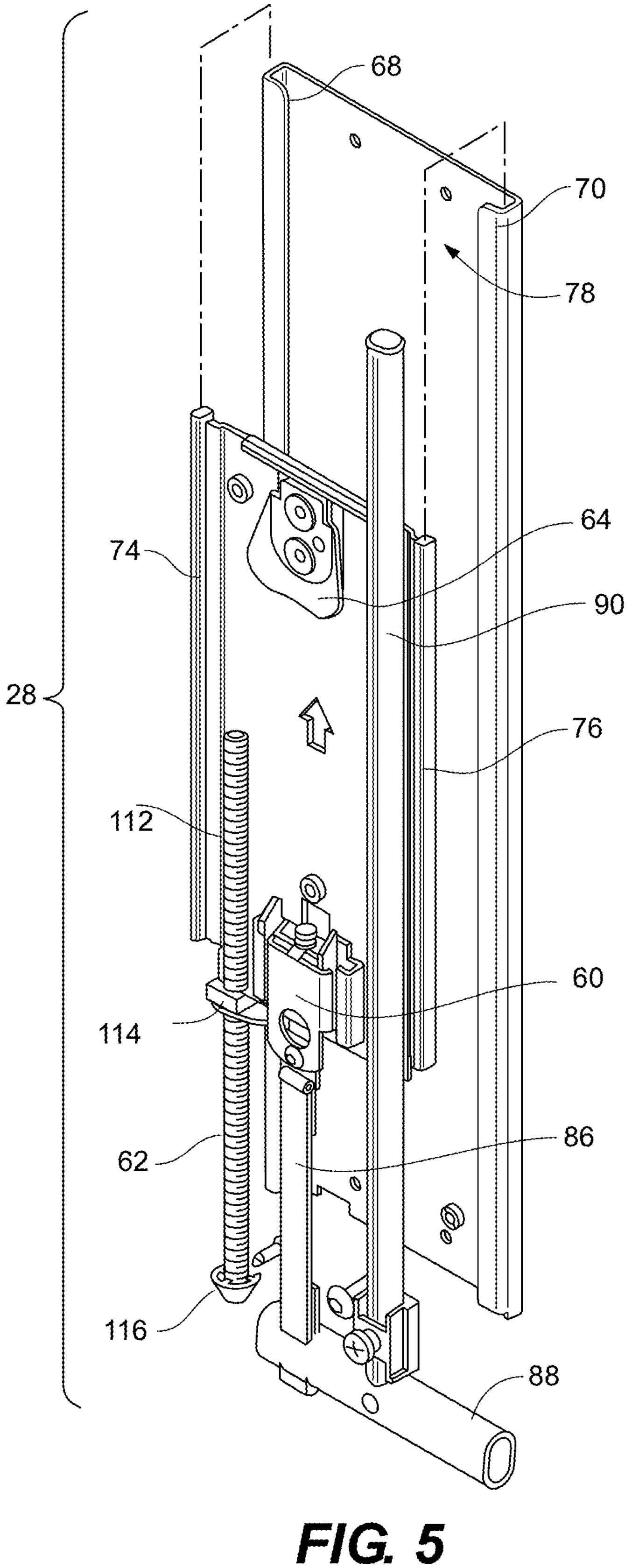
FIG. 5 is an exploded isometric view of the center column of the display interface of FIG. 3.
Figure 6:
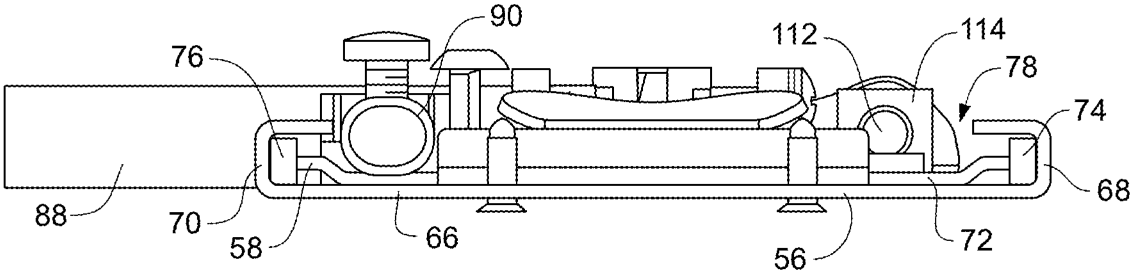
FIG. 6 is a partial top plan view of the display interface of FIG. 3.
Figure 7:
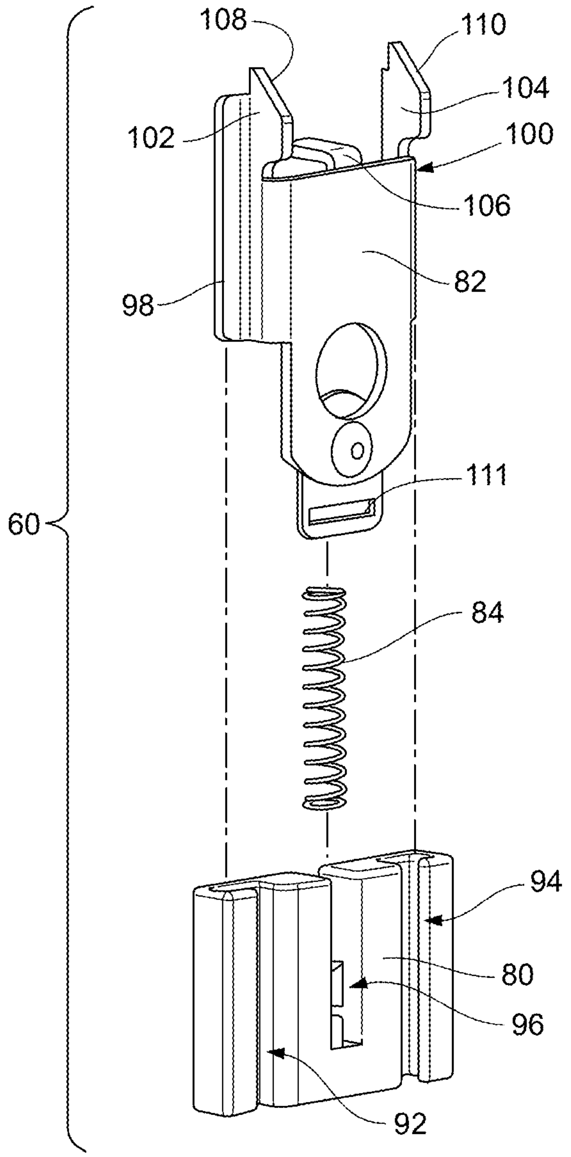
FIG. 7 is an exploded view of a portion of the click lock assembly of the display interface of FIG. 3.

Central column 28 of display interface assembly 22 is depicted in FIGS. 4-6 and 9, and generally includes guide 56, coupler plate 58, click lock assembly 60, height adjustment assembly 62, and securing member 64. Guide 56 generally includes backplane 66 with c-shaped, in cross section, side portions 68, 70. Coupler plate 58 generally includes body portion 72 and bushings 74, 76. As depicted in FIG. 5, bushings 74, 76, are slidably received in c-shaped side portions 68, 70, so that coupler plate 58 is vertically slidable in recess 78 defined by guide channel 56.

Click lock assembly 60 is depicted in FIGS. 2, 4, 5, and 7, and generally includes guide housing 80, latch 82, biasing spring 84, and pull strap 86. Pull strap 86 can be coupled with optional pull handle 88 which is guided by guide shaft 90. Guide housing 80 is fixed to coupler plate 58. Guide housing 80 defines grooves 92, 94, and spring recess 96. Latch 82 has laterally projecting flanges 98, 100, latch projections 102, 104, and spring tab 106. Laterally projecting flanges 98, 100, are slidably received in grooves 92, 94, and biasing spring 84 is received in spring recess 96 and abuts spring tab 106 such that latch 82 is biased upward relative to guide housing 80. Latch projections 102, 104, have tapered upper edges 108, 110. Pull strap 86 is coupled to latch 82 with connector 111 and can be pulled downward, causing latch 82 to move downward against the bias of biasing spring 84.

Height adjustment assembly 62 generally includes drive screw 112 and nut 114. Drive screw 112 is retained in crossbar 36 such that rotation of drive screw 112 via head 116 causes drive screw 112 to rotate but not translate. Nut 114 is fixed to coupler plate 58 and is threaded onto drive screw 112 such that nut 114 moves along drive screw 112 when drive screw 112 is rotated, thereby sliding coupler plate 58 up or down in recess 78, depending on the direction of rotation.

Figure 8:
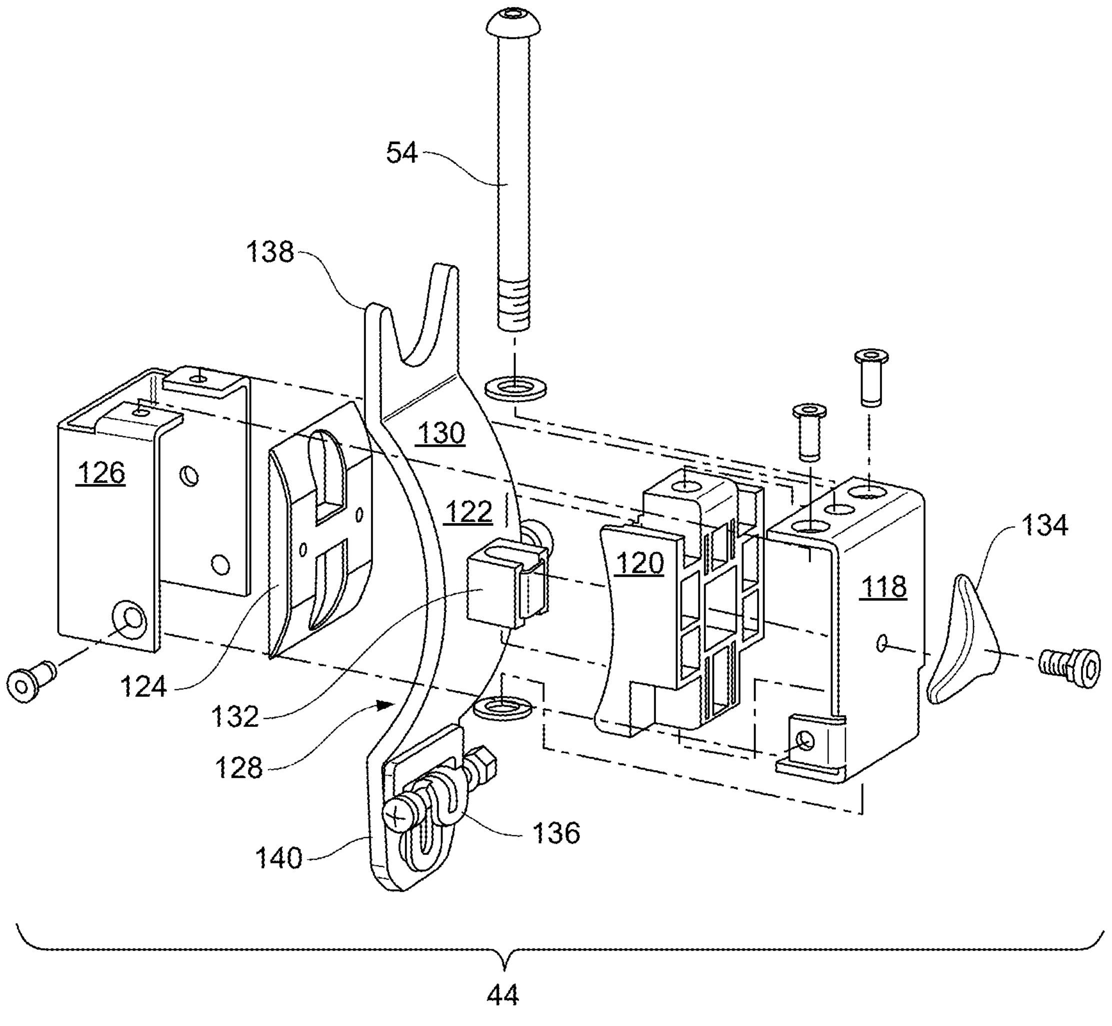
FIG. 8 is an exploded view of the tilt head assembly of the mount of FIG. 2.
Figure 9:
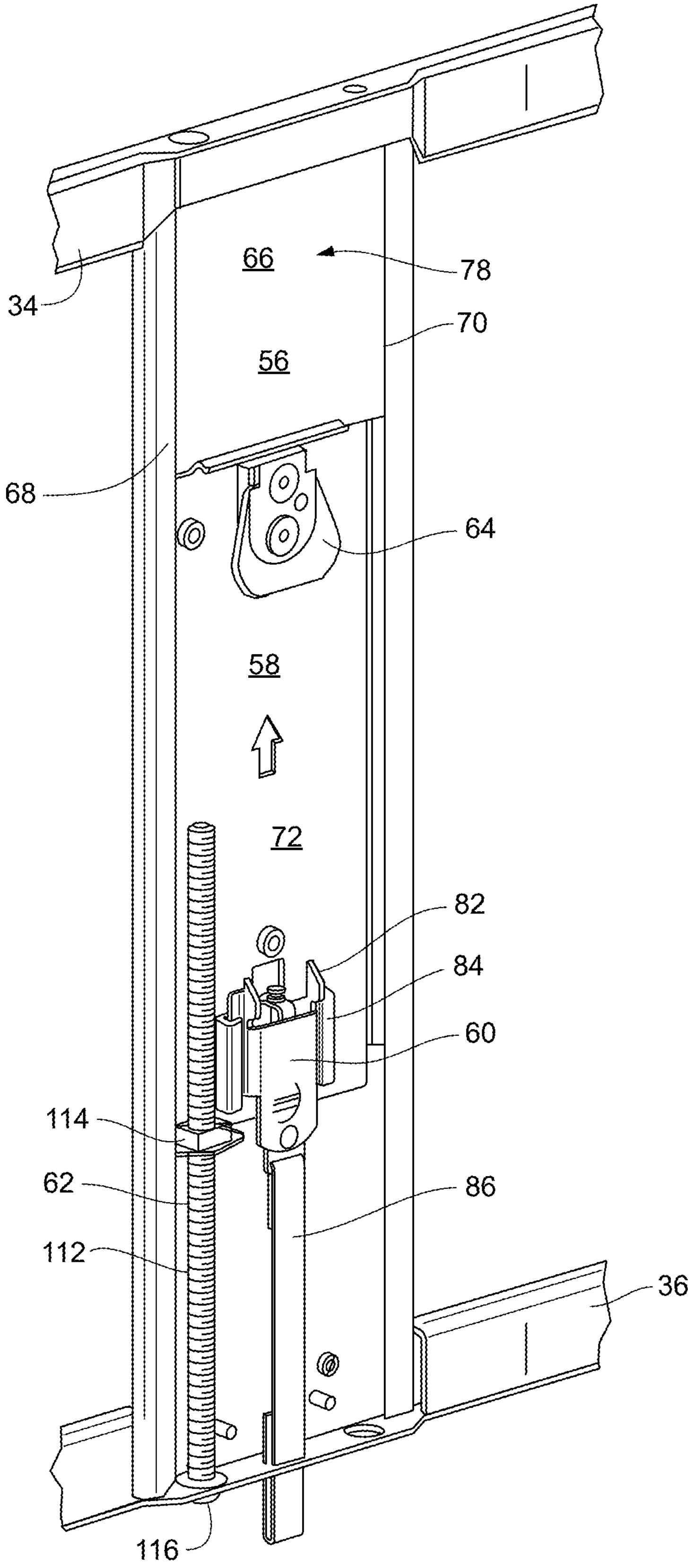
FIG. 9 is a partial rear isometric view of the display interface of FIG. 3.

Tilt head assembly 44, as depicted in the exploded view of FIG. 8, generally includes pivot bracket 118, rear glide 120, tilt guide 122, front glide 124, and housing 126. Tilt guide 122 is slidably sandwiched between rear glide 120 and front glide 124 such that tilt guide 122 can slide between rear glide 120 and front glide 124 along the curved front 128 and rear 130 surfaces. Rear glide 120, tilt guide 122, and front glide 124 are contained within housing 126 which is attached to pivot bracket 118. Tilt head assembly 44 is pivotally attached to outer arm 42 with pivot 54. Push block 132 and friction control 134 are provided to add or remove friction from the sliding motion of tilt guide 122 as desired. Roll assembly 136 provides rolling motion adjustment for the assembly to enable skewing (i.e. altering the orientation of the edges relative to the floor) of display 148. As depicted in FIG. 4, tilt head assembly 44 can be removably coupled to display interface 22 with top edge 138 of tilt guide 122 fitted behind securing member 64, and bottom edge 140 of tilt guide 122 fitted behind latch 82.

Uprights 30, 32, are selectively slidable along crossbars 34, 36, to adjust for connections to varying attachment hole patterns of a display 148. Indicia 142 can be provided on crossbars 34, 36, (e.g., 200, 300, 400, etc. mm) to enable easy location to match the VESA pattern of holes on the display. A display 148 can be attached to display interface 22 with fasteners (not depicted) through apertures 144 in uprights 30, 32.

In use, wall interface assembly 26 with attached articulating arm assembly 24, and tilt head assembly 44 can be attached to a wall 150 with suitable fasteners (not depicted) through apertures 146. Display interface 22 can be adjusted for suitable width by sliding uprights 30, 32, along crossbars 34, 36, and attached to the rear of display 148 with fasteners (not depicted) through apertures 144 in uprights 30, 32. Then, display interface 22 and display 148 can be coupled to tilt head assembly 44 by advancing securing member 64 over top edge 138 of tilt guide 122. Then display 148 and display interface 22 can be pushed toward tilt head assembly 44, causing bottom edge 140 of tilt guide 122 to ride along tapered upper edges 108, 110, of latch projections 102, 104, pushing latch 82 downward against the bias of biasing spring 84. Once bottom edge 140 of tilt guide 122 clears latch projections 102, 104, latch 82 will be urged upward by biasing spring 84 such that bottom edge 140 is retained behind latch 82, thereby securing display interface 22 to tilt head assembly 44. The height of display 148 and display interface 22 can then be adjusted relative to the floor and the remainder of mount 20 by rotating drive screw 112 to drive coupler plate 58 up or down in recess 78, depending on the direction of rotation, thereby altering the height of display interface 22 and display 148 relative to the floor and wall interface assembly 26.

When it is desired to unlatch display interface 22 and display 148 from the remainder of the mount, pull strap 86 can be pulled downward to cause latch 82 to move downward, freeing bottom edge 140 of tilt guide 122. The display 148 and display interface 22 can then be lifted upward to disengage.

Figure 10:
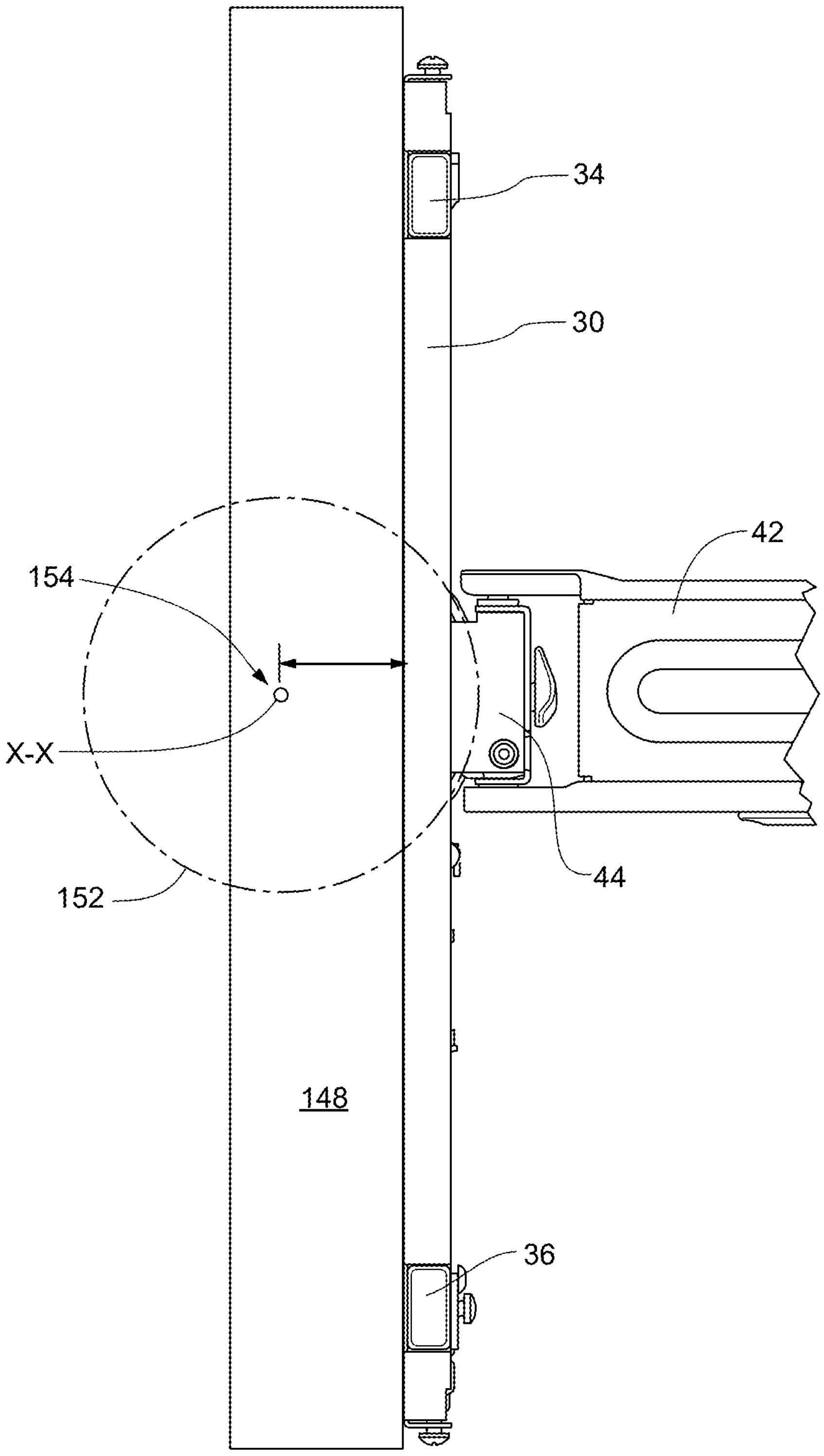
FIG. 10 is right elevation view of the display interface of the mount of FIG. 3 with attached display and depicting the location of the virtual tilt axis.
Figure 11:
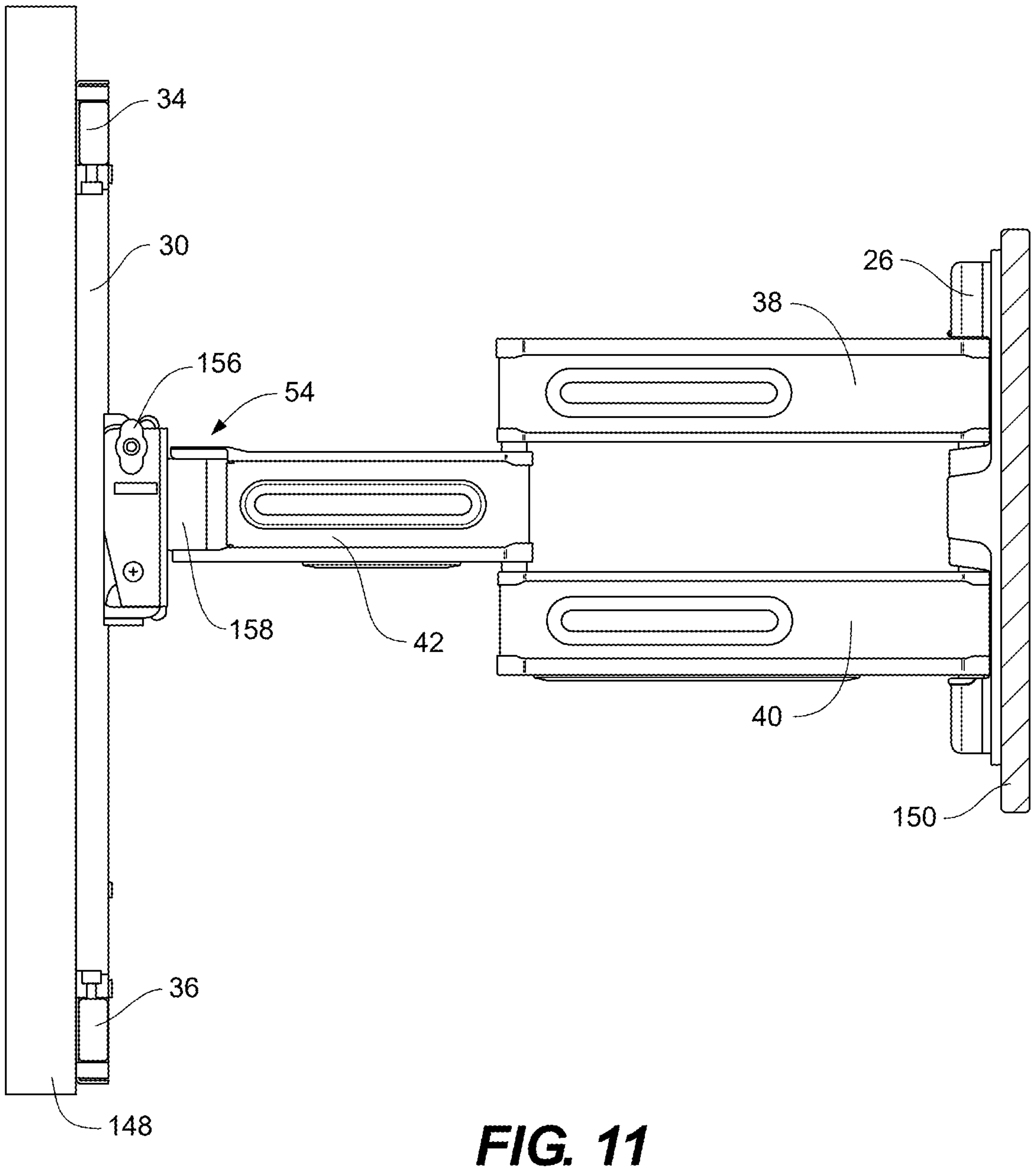
FIG. 11 is a right side elevation view of the mount of FIG. 3 with an alternative tilt head assembly.

As depicted in FIGS. 1 and 10, tilt guide 122 can be configured so as to define a virtual horizontal tilt axis X-X positioned forwardly a distance Y from display interface 22. This can enable a display 148 attached to display interface 22 to maintain a tilt position without excessive friction being added via friction control 134, thus improving ease of use. As depicted in FIG. 10, this can be accomplished by making the curvature of curved front 128 and rear 130 surfaces of tilt guide 122 conform to the circumference of a circle 152 with a center 154 at the desired position of tilt axis X-X.

Figure 12:
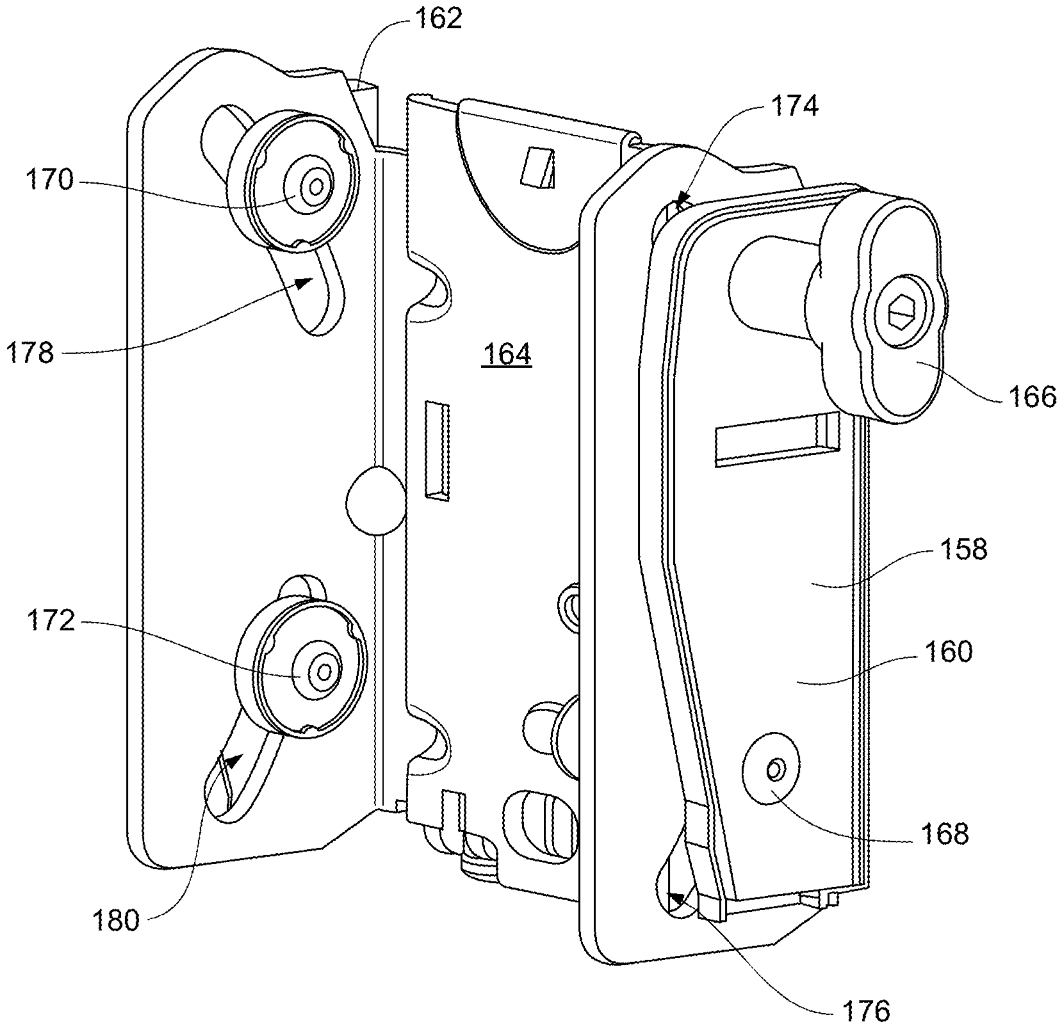
FIG. 12 is a front isometric view of the tilt head assembly of FIG. 11.

It will be appreciated that other tilt head arrangements can be provided within the scope of the invention. For example, as depicted in FIGS. 11-17, tilt head assembly 44 can be replaced with tilt head assembly 156. As depicted in FIG. 12, tilt head assembly 156 generally includes pivot connection bracket 158 having projecting side portions 160, 162, and tilt guide bracket 164. Projecting side portions 160, 162, carry followers 166, 168, 170, 172, respectively, which are fixed in position relative to each other and projecting side portions 160, 162. Pivot connection bracket 158 is pivotally coupled to outer arm 42 with pivot 54 as before.

Figure 13:
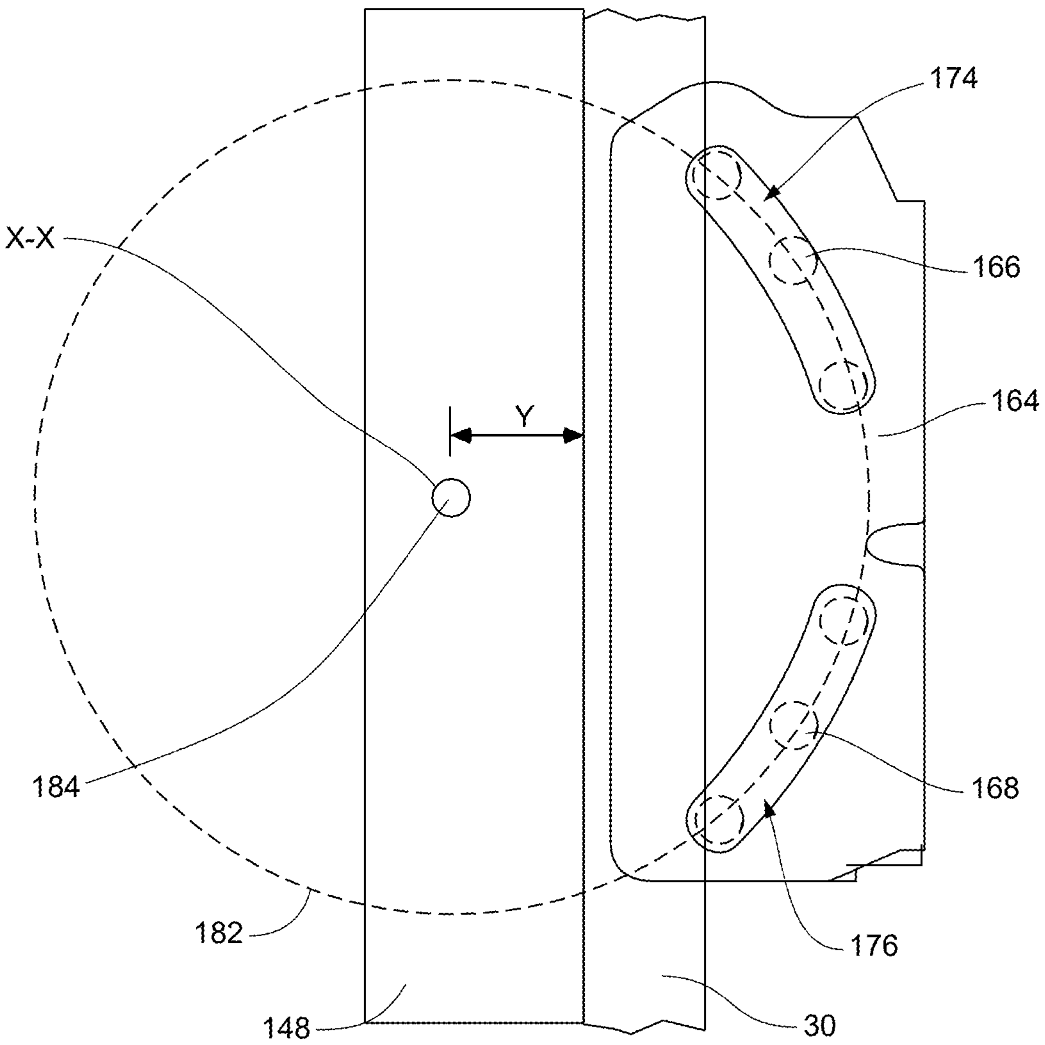
FIG. 13 is a side election view of the tilt guide bracket of the mount of FIG. 11 with an upright and electronic display depicted in phantom, and showing tilt motion with symmetrical arcuate guide slots.

Tilt guide bracket 164 defines guide slots 174, 176, 178, 180, in which followers 166, 168, 170, 172, respectively, slide or roll. As depicted in FIG. 13, guide slots 174, 176, 178, 180, can be disposed along the circumference of a circle 182 with a center 184 coinciding with virtual axis X-X. As depicted in this partial right-side elevation view, guide slots 174, 176, are symmetrical and their radius of curvature centers on center 184. Guide slots 174, 176, will slide over followers 166, 168, enabling tilt guide bracket 164, uprights 30, 32, and an attached display 148 to tilt about virtual tilt axis X-X, which will remain stationary.

Figure 14:
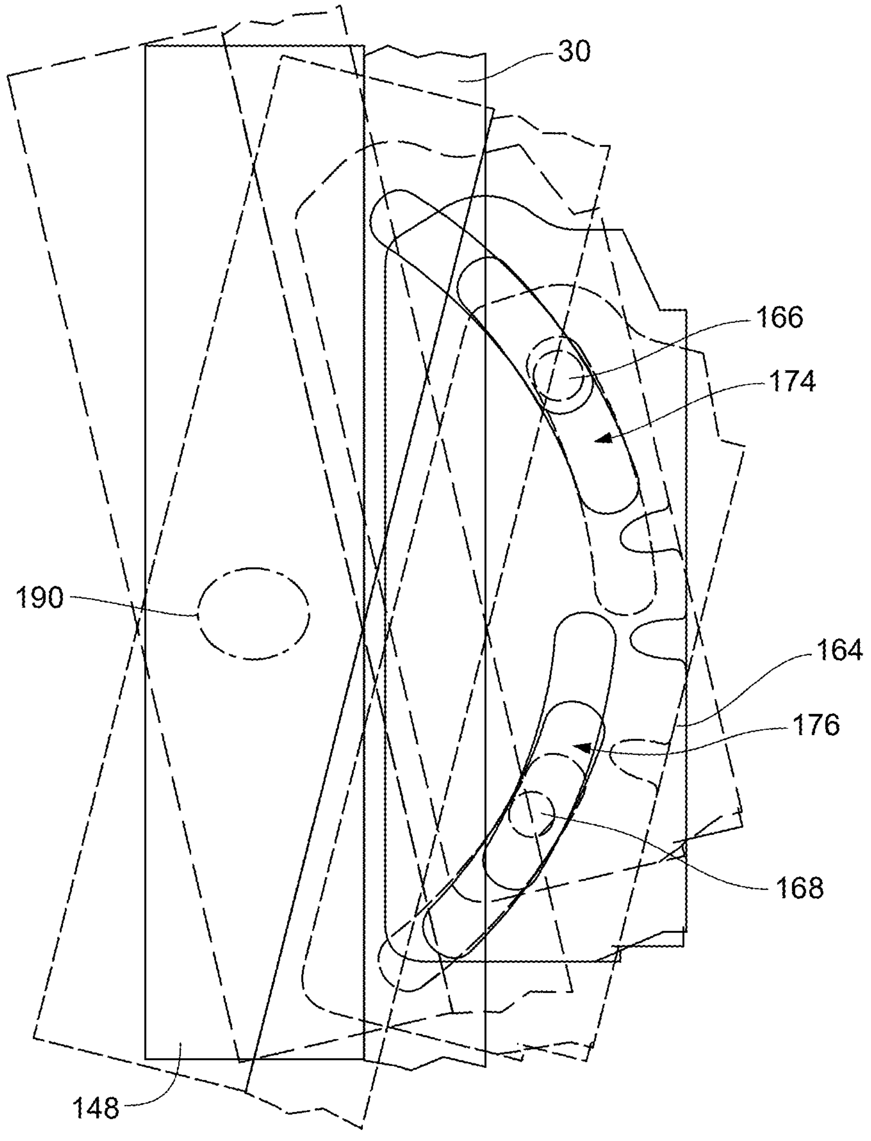
FIG. 14 is a side elevation view of the tilt guide bracket of FIG. 15 showing tilt motion.
Figure 15:
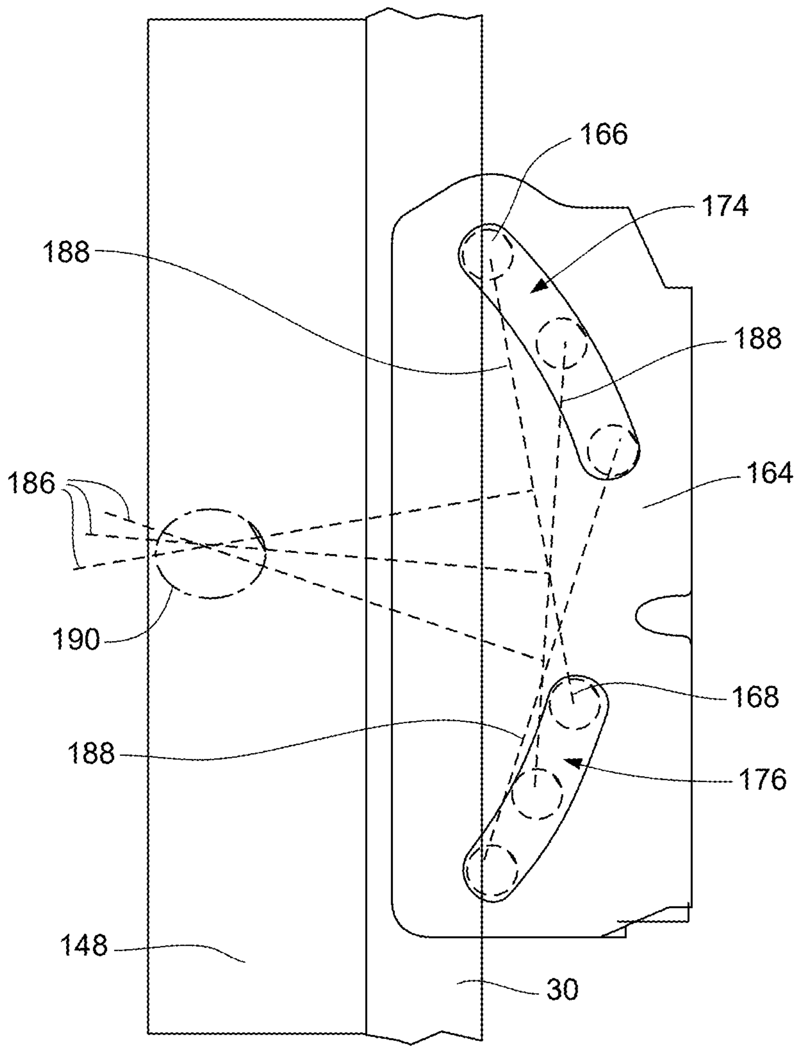
FIG. 15 is a side elevation view of the tilt guide bracket of the mount of FIG. 11 with an upright and electronic display depicted in phantom, and showing the location of the tilt axis and instantaneous center with asymmetrical arcuate guide slots.

Other examples of different slot configurations are depicted in FIGS. 14-17. In FIGS. 14 and 15, guide slots 174, 176, are arcuate, but have different lengths and are not disposed symmetrically. With this configuration, as depicted in FIG. 15, tilt guide bracket 164, uprights 30, 32, and attached display 148 will tilt about an instantaneous center according to well-known principles of machine kinematics. Followers 166, 168, are located a fixed distance apart and are essentially fixed in position relative to projecting side portions 160, 162, and outer arm 42. As a result, the instantaneous center of tilting motion of tilt guide bracket 164 will lie along a line 186 perpendicular to the midpoint of a line 188 drawn between the relative positions of followers 166, 168, in guide slots 174, 176, within the range of tilt motion of tilt guide bracket 164. As depicted in FIG. 15, the region 190 within which lines 186 intersect will mark the approximate location of the instantaneous center. Virtual tilt axis X-X can be conceptualized as shifting continuously during the tilt motion of tilt guide bracket 164, and positioned at points within region 190.

Figure 16:
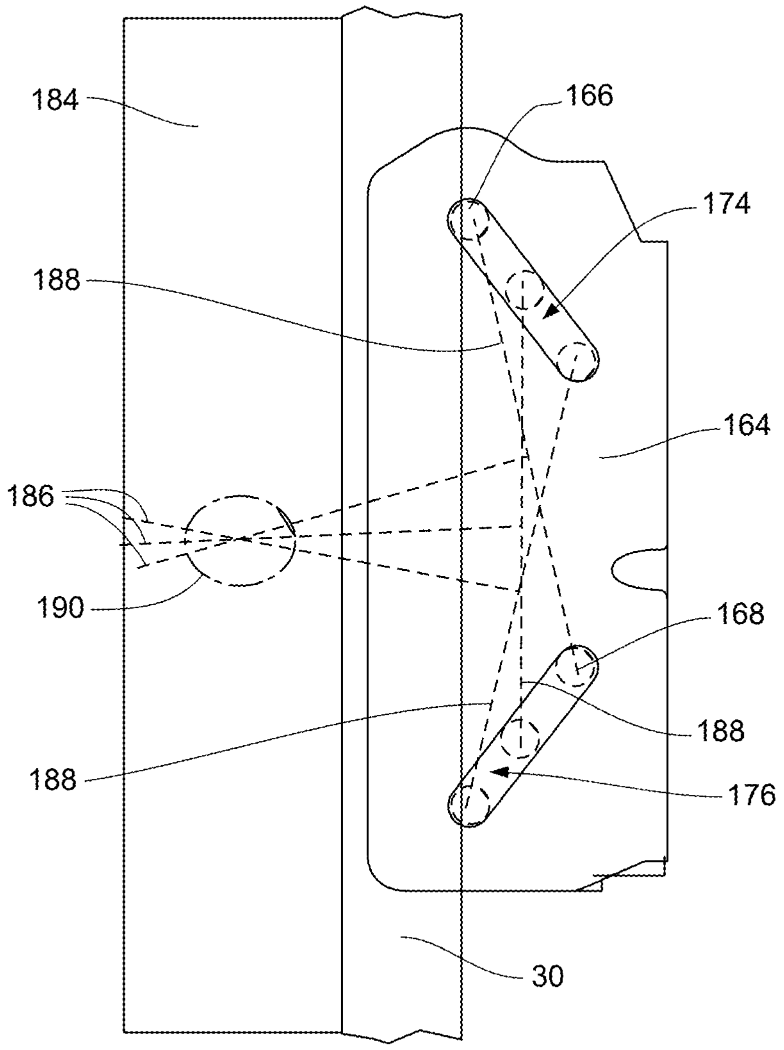
FIG. 16 is a side elevation view of the tilt guide bracket of the mount of FIG. 11 with an upright and electronic display depicted in phantom, and showing the location of the tilt axis and instantaneous center with symmetrical straight guide slots.
Figure 17:
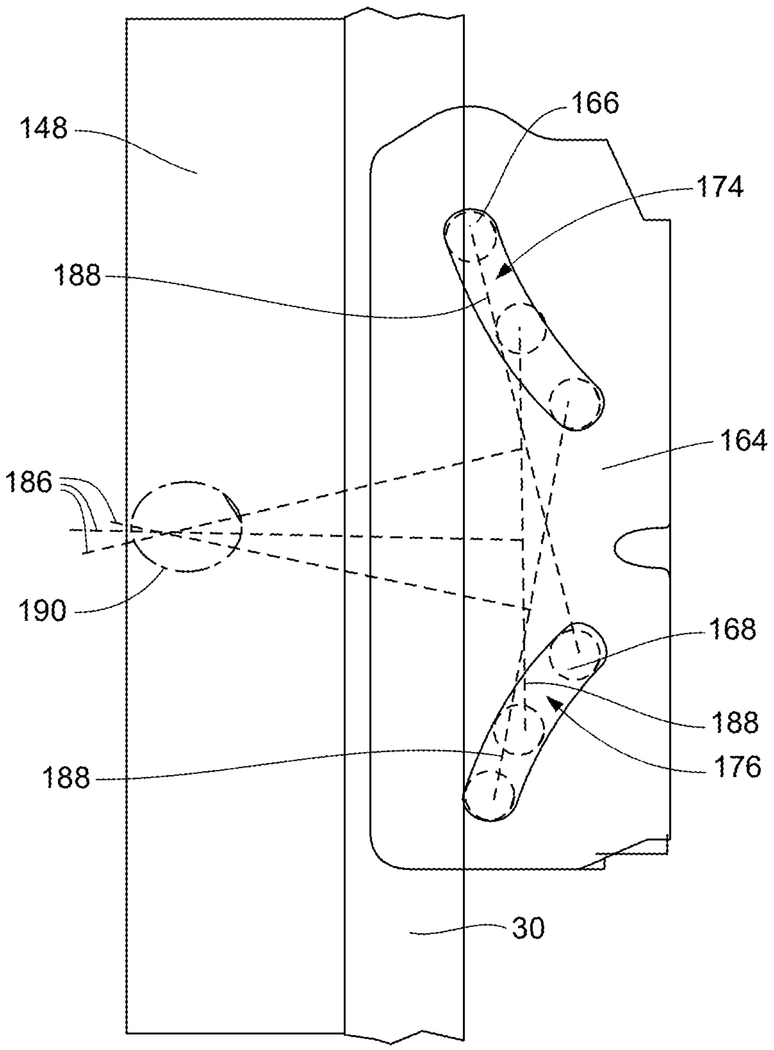
FIG. 17 is a side elevation view of the tilt guide bracket of the mount of FIG. 11 with an upright and electronic display depicted in phantom, and showing the location of the tilt axis and instantaneous center with symmetrical reverse arcuate guide slots.

Similarly, FIG. 16 depicts guide slots 174, 176, as being straight, and FIG. 17 depicts guide slots 174, 176, as being arcuate, but curved in the opposite direction from guide slots 174, 176, of FIG. 13. In these instances, tilt guide bracket 164, will tilt about an instantaneous center disposed within region 190.

Hence, it will be appreciated that guide slots 174, 176, 178, 180, can be virtually any shape or geometry enabling tilt motion of tilt guide bracket 164 about a virtual tilt axis X-X, and which may be embodied by a shifting instantaneous center. It will be further appreciated that the geometry of guide slots 174, 176, 178, 180, can be such that a greater or lesser tilt range (e.g., 5 to 15 degrees) is provided at the top of display interface 22 relative to the bottom.

Hence, the embodiments described provide a convenient way of adjusting the height of a wall mounted television or monitor about the floor with a single adjustment. This solution can be applied to any mount, whether provided with an arm assembly capable of pivoting or not, and whether or not the mount is provided with tilt capability.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A mount for attaching a television or monitor to a wall, the mount comprising:
- a wall interface assembly adapted to attach to the wall;
- a support assembly presenting a first end and a second opposing end, the first end operably coupled to the wall interface assembly; and
- a display interface adapted to receive the television or monitor and operably coupled to the second end of the support assembly, the display interface comprising:
  - a display attachment assembly; and
  - a height adjustment assembly operably coupling the second end of the support assembly and the display attachment assembly, the height adjustment assembly including:
    - a guide;
    - a coupler plate coupled with the second end of the support assembly, the guide engaged with the coupler plate such that the guide is vertically slidable on the coupler plate, a nut being fixedly coupled to the coupler plate; and
    - an adjustment screw coupled to the guide and threadedly engaged with the nut, the adjustment screw rotatable to cause vertical shifting of the guide on coupler plate, wherein the display attachment assembly is translated upward or downward relative to the support assembly depending on the direction of rotation of the adjustment screw.

2. The mount of claim 1, further comprising a tilt head assembly operably coupling the second end of the support assembly and the coupler plate, the tilt head assembly arranged to enable selective tilting of the display interface about a virtual tilt axis spaced-apart forwardly from the display interface.

3. The mount of claim 2, further comprising a latch, the latch operable to selectively secure the tilt head assembly to the coupler plate.

4. The mount of claim 2, wherein the tilt head assembly includes an arcuate tilt guide sandwiched between a rear glide and a front glide.

5. The mount of claim 2, wherein the tilt head assembly comprises a pivot connection bracket operably coupled to the support assembly and carrying a plurality of followers and a tilt guide bracket coupled to the coupler plate and defining a plurality of guide slots, each one of the plurality of followers engaged in a separate one of the plurality of guide slots.

6. The mount of claim 5, wherein the guide slots are symmetrical and the virtual tilt axis is fixed in position relative to the display interface.

7. The mount of claim 5, wherein the guide slots are asymmetrical and the virtual tilt axis shifts with an instantaneous center of rotation of the tilt guide bracket.

8. The mount of claim 1, wherein the display attachment assembly comprises a pair of spaced-apart horizontal crossbars and a pair of spaced-apart vertical uprights, the vertical uprights adapted to attach to the television or monitor, the crossbars operably coupled to the elongate guide.

9. The mount of claim 8, wherein each of the spaced-apart vertical uprights is separately selectively shiftable on the spaced-apart horizontal crossbars.

10. The mount of claim 1, wherein the support assembly comprises a single arm.

11. The mount of claim 1, wherein the support assembly comprises at least one articulating arm.

12. An electronic display system, the system comprising:
a television or monitor; and
a mount comprising:
a wall interface assembly adapted to attach to a wall;
a support assembly presenting a first end and a second opposing end, the first end operably coupled to the wall interface assembly; and
a display interface adapted to receive the television or monitor and operably coupled to the second end of the support assembly, the display interface comprising:
a display attachment assembly; and
a height adjustment assembly operably coupling the second end of the support assembly and the display attachment assembly, the height adjustment assembly including:
a guide;
a coupler plate coupled with the second end of the support assembly, the guide engaged with the coupler plate such that the guide is vertically slidable on the coupler plate, a nut being fixedly coupled to the coupler plate; and
an adjustment screw coupled to the guide and threadedly engaged with the nut, the adjustment screw rotatable to cause vertical shifting of the guide on coupler plate, wherein the display attachment assembly is translated upward or downward relative to the support assembly depending on the direction of rotation of the adjustment screw.

13. The system of claim 12, further comprising a tilt head assembly operably coupling the second end of the support assembly and the coupler plate, the tilt head assembly arranged to enable selective tilting of the display interface about a virtual tilt axis spaced-apart forwardly from the display interface.

14. The system of claim 13, further comprising a latch, the latch operable to selectively secure the tilt head assembly to the coupler plate.

15. The system of claim 13, wherein the tilt head assembly includes an arcuate tilt guide sandwiched between a rear glide and a front glide.

16. The system of claim 13, wherein the tilt head assembly comprises a pivot connection bracket operably coupled to the support assembly and carrying plurality of followers and a tilt guide bracket coupled to the coupler plate and defining a plurality of guide slots, each one of the plurality of followers engaged in a separate one of the plurality of guide slots.

17. The system of claim 16, wherein the guide slots are symmetrical and the virtual tilt axis is fixed in position relative to the display interface.

18. The system of claim 16, wherein the guide slots are asymmetrical and the virtual tilt axis shifts with an instantaneous center of rotation of the receiving bracket.

19. The system of claim 12, wherein the display attachment assembly comprises a pair of spaced-apart horizontal crossbars and a pair of spaced-apart vertical uprights, the vertical uprights adapted to attach to the television or monitor, the crossbars operably coupled to the elongate guide.

20. The system of claim 19, wherein each of the spaced-apart vertical uprights is separately selectively shiftable on the spaced-apart horizontal crossbars.

21. The system of claim 12, wherein the support assembly comprises a single arm.

22. The system of claim 12, wherein the support assembly comprises at least one articulating arm.

* * * * *